Sept. 5, 1967   H. F. HAMILTON ETAL   3,339,437
APPARATUS AND PROCESS FOR REMOVING SHIELD FROM
CABLE OR THE LIKE MATERIAL
Filed March 15, 1966   2 Sheets-Sheet 1

INVENTORS
HERBERT F. HAMILTON
WILLIAM G. CALLOW
by JEFFERS & YOUNG
ATTORNEYS

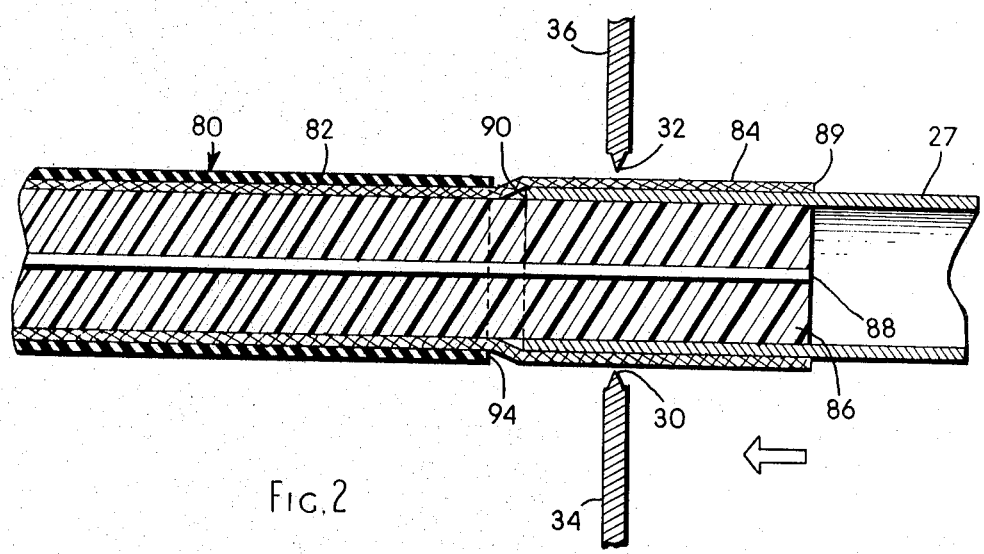
Fig. 2
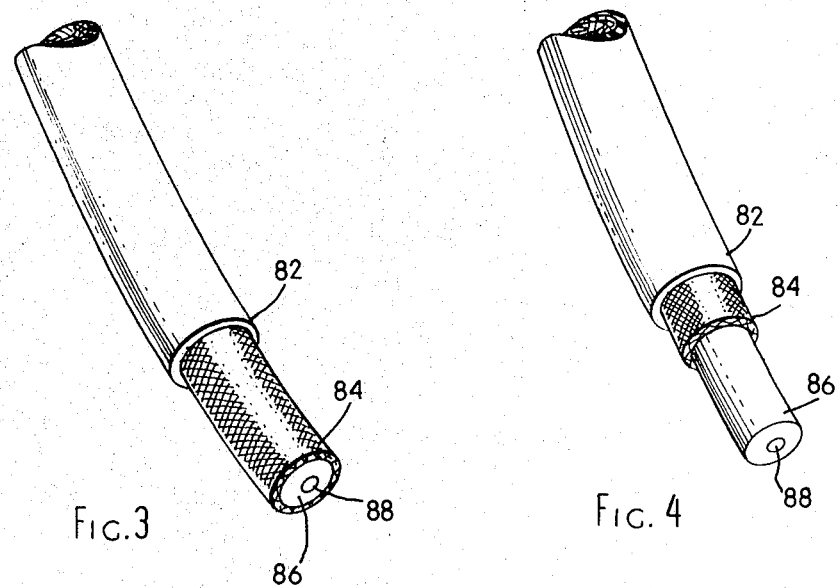
Fig. 3
Fig. 4

United States Patent Office 3,339,437
Patented Sept. 5, 1967

3,339,437
APPARATUS AND PROCESS FOR REMOVING SHIELD FROM CABLE OR THE LIKE MATERIAL
Herbert F. Hamilton and William C. Callow, Fort Wayne, Ind., assignors to The Magnavox Company, Fort Wayne, Ind., a corporation of Delaware
Filed Mar. 15, 1966, Ser. No. 534,394
6 Claims. (Cl. 81—9.51)

ABSTRACT OF THE DISCLOSURE

A tubular, metallic anvil is positioned between an outer shield and insulation inside the shield of a cable to support the shield as it is cut by blades, and to protect the insulation from the blades. The location of the anvil relative to the blades determines the amount of shield that is cut off.

This invention relates to improved apparatus and process for removing shield material from insulated wire or the like. In fabrication of electrical devices, it is necessary to fabricate electrical conductors of certain prescribed lengths and sizes. In the course of such fabrication and in particular when such shielded wire is utilized, it becomes necessary to remove a part of the shield from the insulated wire in order to make, when necesary, certain electrical connections to the shield or other conductors of the wire. During the stripping or removing of such shield care must be exercised to avoid damage to the remaining insulation. If the insulation underlying the shield should become damaged by nicking, cutting or other injury, then the resulting trimmed conductor must be discarded. In numerous applications the purchaser establishes rigid specifications concerning where the severing operation must occur and that such severing must be performed without producing injury to the adjacent sublayer of the insulation. It is generally required that the shield be severed or trimmed in a neat and workmanlike manner without injury to the tinned or other protective coating or finish as may be used on the conductors of the said shield.

Many attempts have been made to selectively remove portions of a shielded cable and three methods which have been utilized in the industry are mechanical, thermal and chemical. While the thermal and chemical methods have been used with some degree of success in stripping insulation from wire they are not found to be as suitable in severing or stripping metallic shielding of shielded type cables. When the thermal method is used for severing metallic shielding the high electrical currents which pass through specified location of cutoff can produce damage to the adjacent insulation material. Only the mechanical method of stripping shield material has proved feasible. The chemical method is totally unacceptable. In following the mechanical method of removal a variety of different proposed cutting tools and blades have been proposed but they are deficient generally in that the cutting mechanism must be adjust to cut through a thin shield or braid without "overcutting" into and damaging the insulation beneath the shield. It must be possible to produce a very precise cutting depth in order to prevent injury to the inner insulation and this may necessitate from time to time a change or adjustment in the cutting blade or tool to take into account the different size shields and the materials of construction. There is the further complication of changes in size of the wire or cable itself because of mechanical tolerances. For example, should the wire or cable vary in size then the cutting tool must also vary in its cutting action.

In order to meet these functional requirements the art has used for the most part shears or hand operated cutters known as "side-cutters" but this method is found to be slow and ill adapted to the large amounts of cable which must be stripped both accurately and in a brief time. In other words, the hand operated method is not only tedious and time consuming but expensive as well and it produces a variation in each stripped cable with regard to the length of the stripped shield. While the degree of variation can be minimized by the operator's skill and ability to hold a constant dimension, the variations are inherent because of the element of human error. Numerous hand operated mechanical devices now in existence share generally the aforementioned shortcomings and in addition thereto have a relatively short life because the cutting tools cannot be resurfaced or replaced and the use of dull tools necessarily results in poor trimming and is apt to produce damage to the cable or wire insulation.

It is one of the principal objects of the present invention to provide an improved apparatus and process for quickly and accurately stripping metallic shielding or other material from an insulated wire and performing such operations at high speeds and in an accurate manner.

It is a further object of the present invention to perform the stripping operation without producing injury to the underlying insulation and by this is meant, that suitable safeguarding is made against injury to the subjacent layer of insulation material preventing it from being nicked, cut or in any way injured during the stripping operation.

Another important feature of the present invention is that the stripping operation can be performed rapidly and at accurate locations regardless of the normal variation in size of the shielded wire which is fabricated with the usual manufacturing tolerances.

A further object of the present invention is to provide a process for stripping metallic shield from insulation wire and to effect this in an accurate rapid manner without producing injury to the subjacent layer of insulation and to do so regardless of variations in dimension which are the normal occurrence.

It is an important advantage of the present invention that any desired trimmed length of shield can be obtained in accordance with the ultimate use of the product, that is, a remaining shield length of whatever dimension required is readily obtained in order to produce whatever electrical connections are found desirable in the product incorporating the conductor wire.

The above and other objects and features of the present invention will become apparent from a consideration of the following description, which proceeds with reference to the accompanying drawings, wherein:

FIGURE 2 is an enlarged sectional view of the conductor wire as it is fitted on to the anvil and illustrating the cutter blades about to effect the cutting operation;

FIGURE 3 is an isometric view of the conductor wire before the shield is severed; and, FIGURE 4 illustrates the same conductor wire as in FIGURE 3 but after the shield has been severed.

Figure 1:
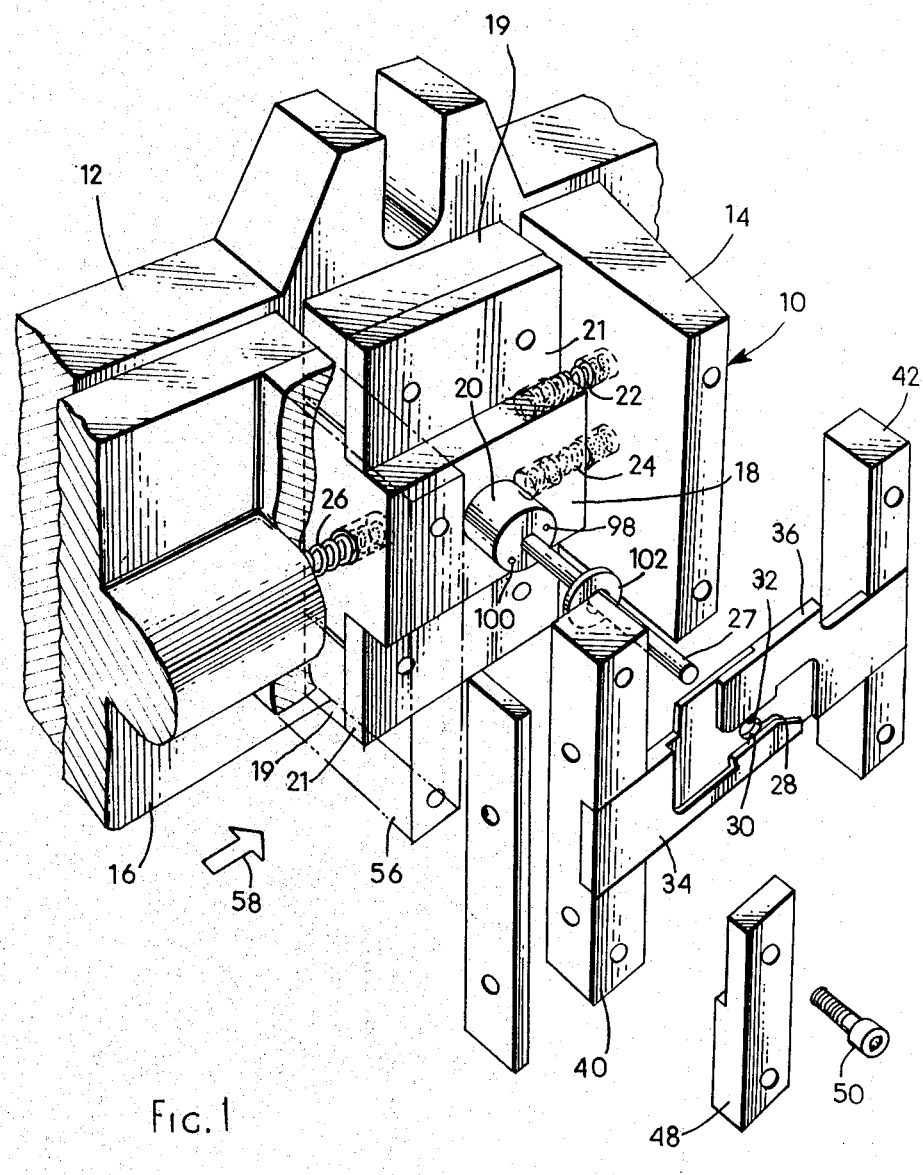
FIGURE 1 is an exploded isometric view of the apparatus for stripping the conductor wire.

Referring now to the drawings, the apparatus, designated generally by reference numeral 10, includes a backing 12 and a pair of spaced apart opposed jaw vises 14 and 16. The vise 16 is movable toward and away from a mounting block 18 having a collet 20, the block 18 being horizontally movable between upper and lower guides 19 having overlying members 21, and between spaced springs 22, 24 and 26.

Within collet 20 is a thin walled tubular member 27 which serves as an anvil or arbor during the stripping operation. The tubular anvil 27 can be adjusted into or out of the collet 20 according to the length of shielding material removed, that is, the length of the shielding which remains beyond the severed end of the outer insulation. The supporting structure for the mounting block 18 permits the anvil 27 to center itself horizontally with respect to opening 28 provided by the complementary notched cutting edges 30 and 32 of blades 34 and 36, respectively. The blades are carried by mounting uprights 40 and 42, upright 42 being secured in some suitable manner as by bolts or the like to stationary vise 14 and the other blade 34 being secured to upright 40 by clamp 48 with bolt 50 to the movable end wall 56 which is carried by the movable vise 16. Thus, when the vise 16 moves in the direction of the arrow 58 (FIG. 1) the blade 34 together with its notched cutting edge 30 closes with edge 32 of the blade 36, the two notched sections 30, 32 coming together to form an opening 28 which closes over the shielded wire, severing a selected shield portion thereof.

Referring next to FIGURE 2, an insulated wire 80 has its outer insulation layer 82 removed exposing the metal shielding 84 which is the portion intended to be severed and stripped. The purpose of the present invention is to effect severing of the shield 84 without in any way injuring the subjacent layer 86 of insulation material either by nicking it, cutting it or deteriorating it by exposure to heat or in any other way damaging its condition. This procedure has prevented any damage to the outer or inner insulation layers and damage to the ends of the shield in the way of frayed or loose ends.

Within the insulation 86 is a conductor wire 88. In operation, the conductor wire's outer surface lamination of insulation 82 is first stripped by a preferred amount, and then the end 89 of shield 84 is enlarged, permitting the end 89 to slip over the end 90 of anvil 27 so that the relatively thin walled tubular anvil 27 is fitted between the inner surface of shield 84 and the outer surface of insulation 86. The anvil forms a shield around insulation 86 and is constructed of a high tensile stainless steel that does not collapse, nor is it penetrated by the blades 30, 32 thereby preventing injury to the subjacent layer of insulation 86. The location of the trimming or cutting is determined by the position of the anvil 27 relatively to the cutting blades 34, 36, since the distance that the shield 84 can be slipped on or over the anvil 27 is limited by the end 94 of the insulation layer 82 being stopped by the end 90 of the anvil 27. Thus, should it be desired to have a greater amount of shield remaining after the cutting, the anvil 27 is pulled out of the collet 20 (outwardly in FIG. 1) leftwardly (FIG. 2) and in this manner, there is a greater portion of the shield 84 which remains after the cutting operation is completed. Thus, it is possible to determine the length of shield extending from the end 94 of outer insulation layer 82 by extending the anvil 27 outwardly or retracting it inwardly into the collet 20.

When inserting the insulated wire onto the anvil 27 the insulated wire is moved onto the anvil 27 until it cannot move any further, this being determined by the end 90 of the anvil 27 approaching the end 94 of insulation layer 82. When the end 90 of the anvil 27 has moved approximately to the position shown in FIG. 2 it cannot move any further because of binding with the outermost layer 82. This binding determines the fully inserted position of the insulated wire after the operator has positioned it in place for cutting.

The operator then actuates an air motor, hydraulic motor or the like (not shown) thus moving the vise 16 in the direction of the arrow 58 and concurrently causing blade 34 to close with relation to blade 36 thereby causing the cutting edges 30 and 32 to penetrate shield 84 completely severing the shield when the blades pass through the shield and bear against the underlying anvil 27. As shown in FIG. 4, there is a part of the shield 84 which extends beyond the outermost layer 82 of insulation and the length of that shield portion is determined by adjusting the anvil 27 into and out of the collet 20.

As the cutting operation is performed, the blades 34 and 36 are prevented from entering or in any manner nicking, cutting or otherwise damaging the insulation layer 86 which is protected by the overlying anvil 27. The severed portion of the shield can be removed, after the vise jaw 16 has been reversed from the direction of the arrow 58, opening the jaws and blades 34, 35 and the stripped insulation wire, which originally looked like FIG. 3, has been trimmed to that of FIG. 4. The severed section is removed by means of two pneumatic pressure openings 98, 100 which propel the washer 102 along the length of the anvil 27 pushing the severed shield section off of the end of the anvil 27. The washer 102 is prevented from leaving the end of the anvil 27 because it engages the blades 34, 36.

There is thus accomplished, in a very reliable accurate manner, both the place of cutting and a cleanness of cutting. The efficiency of cutting is substantially improved over what was previously obtainable either with thermal or hand-operated mechanical means. The cutting in no way interferes with the subjacent layer of insulation 86, therefore very little, if any, insulated wire must be discarded because of objectionable injury to that portion of the insulation.

As compared with previous hand-operated methods of stripping wire, the present invention is far faster, providing in the order of six fold increase over previous methods and the operation can easily be self-compensating for dimensional variations in the insulated wire. For example, any out of roundness or change in dimension of the insulated wire can be readily compensated for by the present invention; and moreover, such variations of dimension do not involve any injury to the insulation layer 86.

The present invention is useful not only in trimming metal shielding but is also useful in trimming any intermediate layer material which lies between concentric outer and inner layers. For example, the shield material referred to by reference numeral 84 need not be any particular material and, in fact, can be an insulation material as well. The apparatus and process described is in no way dependent upon a particular composition, size or combination of materials worked upon. In other words, referring to FIGS. 3 and 4, the three layers can be metallic or nonmetallic, conductive or nonconductive and the only requirement is that the layer severed be expandable or the innermost layer shrinkable to the extent necessary for providing insertion of the anvil 27.

Although the present invention has been illustrated and described in connection with a single example embodiment, it will be understood that this is illustrative of the invention and is by no means restrictive thereof. It is reasonably be expected that those skilled in this art can make numerous revisions and adaptations of the invention and it is intended that such revisions and adaptations will be included within the scope of the following claims as equivalents of the invention.

What is claimed is:

1. Apparatus for stripping wire comprising a metallic tubular anvil proportioned to fit between the inner insulation and the outer shield of said wire, cutter blades adapted to close over said shield to effect severing thereof by penetration through said shield and against the underlying anvil which protectively surrounds said inner insulation against cutting by said blades, means for adjustably positioning said anvil in relation to said blades for defining the location at which said shield is severed thereby effecting a desired residual length of exposed shield, actuating means for closing said blades against the outer surface of said shield to produce severing, and means for opening said blades when the cutting operation is completed.

2. The apparatus in accordance with claim 1 wherein said tubular anvil is of a durable wear resistant metallic composition, and, said positioning means provide movement to effect concentric disposition of said anvil within the opening defined by the closed position of said cutter blades.

3. The apparatus in accordance with claim 1 including means slidably mounted on said tubular anvil for movement thereon to remove the severed shield portion remaining on the outer surface of said anvil, and actuating means for translating said last mentioned means when the cutting operation is completed.

4. The apparatus in accordance with claim 1 wherein said cutter blades include complementary recesses which close together to define a circular opening with a cutting edge which penetrates and severs said shield as said blades are moved together.

5. A process for severing shields from insulated wire, or the like, comprising the steps of: passing a hollow tubular metallic anvil between the inner insulation and outer shield of an insulated wire, closing a pair of complementary blades together to bring the recessed cutting edges thereof against the outer surface of said shield and effect severing of said shield, opening said blades and removing the severed shield portion from the end of said anvil.

6. The process in accordance with claim 5 including the step of adjustably positioning the end of said anvil with respect to said blades to determine the length of residual shield following the cutting operation.

References Cited

UNITED STATES PATENTS

| | | | |
|---|---|---|---|
| 2,765,685 | 10/1955 | Stratman et al. | 81—9.51 |
| 3,103,572 | 9/1963 | Ewald | 81—9.51 |
| 3,175,431 | 3/1965 | Schroeter | 81—9.51 |
| 3,267,774 | 8/1966 | Bilco et al. | 81—9.51 |

WILLIAM FELDMAN, *Primary Examiner.*